United States Patent [19]
Lalumandier et al.

[11] Patent Number: 5,476,115
[45] Date of Patent: Dec. 19, 1995

[54] AUTOMATIC GAS BLENDING SYSTEM

[75] Inventors: Steven R. Lalumandier, League City; Cathy J. Geary; Larry F. Knight, both of Seabrook, all of Tex.

[73] Assignee: Praxair Technology, Inc., Danbury, Conn.

[21] Appl. No.: 209,177

[22] Filed: Mar. 10, 1994

[51] Int. Cl.[6] .................................................. G05D 11/13
[52] U.S. Cl. .............................. 137/101.19; 137/101.21
[58] Field of Search ........................ 137/101.19, 101.21

[56] References Cited

U.S. PATENT DOCUMENTS

| | | | |
|---|---|---|---|
| 4,277,254 | 7/1981 | Hanson | 137/101.19 X |
| 4,345,612 | 8/1982 | Koni et al. | 137/101.19 |
| 4,681,530 | 7/1987 | Huber | 137/101.19 X |

Primary Examiner—Stephen M. Hepperle
Attorney, Agent, or Firm—Alvin H. Fritschler

[57] ABSTRACT

A tracer gas and a carrier gas, such as helium and nitrogen, are blended using flow restrictive orifices in the flow lines for each gas. A process controller is used for automatic adjustment of a control valve in the tracer gas flow line in response to variations in pressure, temperature and flow in the flow lines.

3 Claims, 1 Drawing Sheet

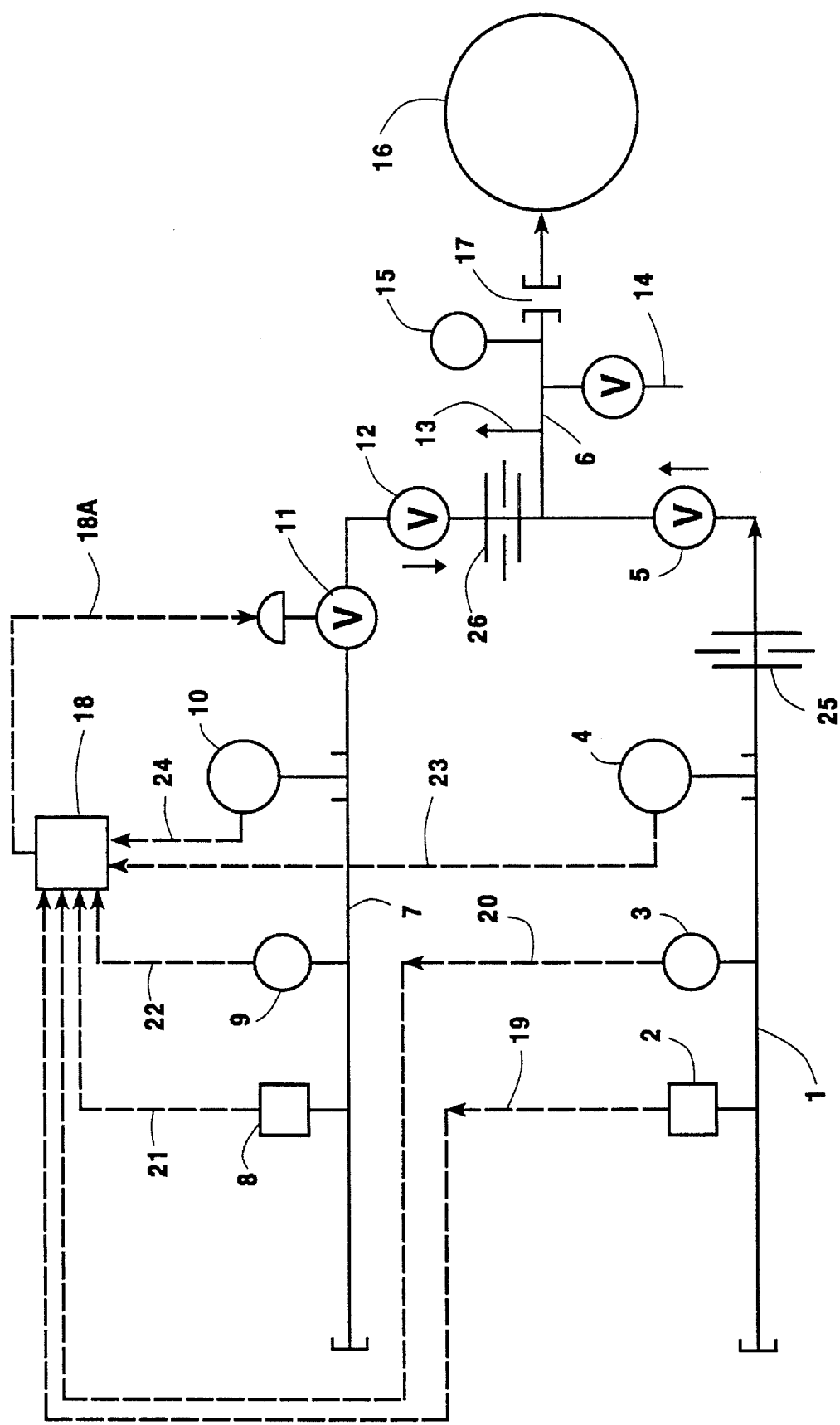

AUTOMATIC GAS BLENDING SYSTEM

BACKGROUND OF THE INVENTION

1. Field of the Invention

This invention relates to a gas blending system. More particularly it relates to a system for the accurate mixing of a tracer gas with a carrier gas for use in leak detection operations.

2. Description of the Invention

An important industrial service carried out in a variety of applications is a leak detection service for the detecting of leaks in pipelines or other fluid passages or storage systems. Such service typically utilizes a mass spectrometer or other devices to sample the atmosphere surrounding a point in a system suspected of containing a leak. Helium, which is commonly used for such purposes, is used because it is rare in the atmosphere and rapidly dissipates into the atmosphere. As a result, a leak in one area does not contribute to a high leak reading in another area, as can occur when other tracer gases, such as fluorocarbons or sulfur hexafluorides, are employed. However, helium is expensive to use in its pure form so an inert carrier gas, typically nitrogen, is blended with the helium and then injected into the system to be checked. While the proportions in which the helium, as the tracer gas, will be mixed with nitrogen, as the carrier gas, can vary, a typical helium/nitrogen mixture will commonly be in the 1–2% range, although higher or lower proportions of helium can also be employed.

One approach to the blending of helium and nitrogen gases, or any other desired mixture, is to inject the two gases into the system to be checked for leaks based upon their partial pressures and the required proportions of the components in the blend. Another approach would be to purchase a tube trailer with the gases already blended, with the blend then being injected into the system. A third approach would be to manually adjust the flow of the gas streams to form the desired mixture.

The first approach referred to above requires that the system be allowed to sit for some undeterminate time to allow the gas mixture to homogenize. In addition, this approach incurs the risk of having a tracer-rich or a tracer-lean gas in so-called dead lakes in the system, resulting in either a false positive or a false negative leak indication. The second approach is more costly and requires more equipment since the blended gases are transported to a job site in gaseous form. In addition, if severe leaks exist, it is easily possible to run out of the blend before the leak detection service is completed. In the practice of the third approach, constant adjustment by a technician is required, making this type of leak detection service more costly and less reliable than desired in practical commercial operations.

There is a genuine need in the art, in light of such circumstances, for further advancement in the gas mixing field, particularly with respect to the preparation of helium/nitrogen blends for use in leak detection services. Such need relates to low cost, simpler systems than provided by the second approach, with more rapid mixing of the component gases can be achieved by the first approach. In addition, it is desired to have a system that is more accurate than the third approach, and can be left unattended, so as to save technician time and make the overall leak detection service more cost effective and reliable.

It is an object of the invention, therefore, to provide an improved gas blending system.

It is another object of the invention to provide a gas blending system having enhanced cost effectiveness and reliability.

It is a further object of the invention to provide a gas blending system having enhanced accuracy and automatic control so as not to require constant adjustment during gas mixing operations.

With these and other objects in mind, the invention is hereinafter described in detail, the novel features thereof being particularly pointed out in the appended claims.

SUMMARY OF THE INVENTION

An automatic gas mixing system for gas blending is provided, with flow restricting orifices used in conjunction with a computer process controller for rapid mixing of the gases in an accurate, reliable, cost effective manner. The automatic gas mixing system of the invention can be operated unattended and does not require constant adjustment during the gas mixing operation.

BRIEF DESCRIPTION OF THE DRAWINGS

The invention is hereinafter described in detail, with reference to the accompanying single figure drawing that is a schematic flow diagram of an embodiment of the gas blending system thereof.

DETAILED DESCRIPTION OF THE INVENTION

The objects of the invention are accomplished by a novel, automatic gas blending system that requires no manual adjustment in use, and automatically compensates for temperature and pressure variations of the two supply gases, i.e. typically helium and nitrogen. The gas blending system of the invention operates independently of the pressure of the system being checked for leaks, and the components of the blend are adjusted continuously, thereby providing a highly accurate blend in a cost effective, rapid manner.

With reference to the drawing, carrier gas, i.e. nitrogen, is introduced into the system, from an available source of supply, through nitrogen flow line 1 containing nitrogen temperature measuring thermocouple 2 and nitrogen pressure measuring transducer 3 upstream of turbine flow meter 4. Downstream nitrogen check valve 5 enables flow of nitrogen gas to gas blending line, i.e. common discharge manifold 6 without backflow in said flow line 1.

Helium as introduced, from an available source, to the system through helium flow line 7 containing helium thermocouple 8 and helium pressure measuring transducer 9. Downstream thereof in said flow line 7 is turbine flow meter 10 and helium flow control valve 11. Further downstream in said helium flow line 7 is helium check valve 12, which enables flow of helium to gas blending line 6 without backflow in said flow line 7.

Gas blending line 6, in practical commercial embodiments, includes pressure relief valve 13 and bleeder valve 14, as well as discharge pressure gage 15. The means for connecting and disconnecting the gas blending system of the invention to a downstream customer system 16, e.g. a system to be checked in a leak detection service, is generally represented by the numeral 17.

In the operation of the system of the invention, process computer/controller 18 is used to provide the desired blend of the components of the desired mixture e.g. helium and nitrogen. Process computer/controller 18 is adapted to compensate for variations in the temperature and pressure of the components of the desired mixture by appropriate adjustment of helium flow control valve 11. For this purpose, input signals are provided to said process controller 18 from the temperature and pressure measuring means in the helium and nitrogen flow lines. Thus, input signals 19 and 20 are transmitted to process computer/controller 18 from said temperature measuring thermocouple 2 and pressure measuring transducer 3, respectively, in nitrogen flow line 1. Similarly, input signals 21 and 22 are transmitted to process computer/controller 18 from said temperature measuring thermocouple 8, and pressure measuring transducer 9, respectively, in helium flow line 7. Process computer/controller 18 is also adapted to receive input signal 23 and 24 from flow meter 4 in nitrogen flow line 1 and from flow meter 10 in helium flow line 7. Based on the input of said pressure, temperature and flow signals, process computer/controller 18 is programmed to maintain the desired blend of helium and nitrogen by adjusting control valve 11 on helium line 7 to provide the correct helium flow based on the nitrogen flow at any given time.

In the practice of the invention, orifice means are desirably positioned downstream of the two turbine flow meters, i.e. turbine flow meter 4 in nitrogen flow line 1 and turbine flow meter 10 in helium flow line 7. The orifices serve to choke the flow in said flow lines and prevent the turbine meters used in preferred embodiments of the invention from being overrun and burned out. This is of particular value during initial pressurization when the system pressure is low and would result in a low back pressure and a high volumetric flow rate. Said choking serves to allow a high mass flow rate to pertain without such a high volumetric flow rate. The use of the process controller in conjunction with such flow restricting orifices enhances the ability of the system to provide more accurate blending of the components, and the benefits of the system over the previously discussed approaches to the desired blending of gases. Thus, nitrogen orifice 25 is preferably positioned in nitrogen flow line 1 downstream turbine flow meter 4, conveniently upstream of check valve 5 in said line. Likewise, helium orifice 26 is desirably positioned in helium flow line 7, preferably downstream of turbine flow meter 10. For the overall purposes of the invention, said helium orifice is also positioned downstream of helium control valve 11, preferably downstream of check valve 12.

Those skilled in the art will appreciate that various changes and modifications can be made in the details of the invention without departing from the scope of the invention as set forth in the appended claims. Thus, flow controlling orifices 25 and 26, or either of them, can be replaced by variable orifices, i.e. valves, but there is little advantage to such substitution in the context of the particular gas blending operations of the invention. Likewise, although turbine flow meters 4 and 10 are preferably employed to facilitate accurate measurements, other readily available flow meters can also be used in the practice of the invention.

While this invention has been described with respect to the blending of helium and nitrogen as a commonly employed, desirable and conveniently detectable tracer gas and inert carrier gas combination, the invention can also be employed using other tracer gas/carrier gas combinations, if convenient at a desired job site, and for the purposes than for the leak detection services referred to herein.

It will be understood that the relative proportions of tracer gas and carrier gas in the blended gas mixture will be determined by the orifices employed and the automatic adjustment of helium control valve 11 by output control signal 18A transmitted from process computer/controller 18 based on the temperature, pressure and flow input signals as indicated above.

The nitrogen carrier gas, which is the primary gas employed, is conveniently transported in liquid form. A large supply of such as nitrogen in liquid form can be made available at a given job site in a cost effective manner. As a result, the problem of shortage, as is encountered with the above-indicated use of a tube trailer of already blended gases, is obviated in the practice of the invention.

The invention enables the blending of tracer gas and carrier gas to be carried out quickly and economically, with accurate blending under varying conditions of temperature, pressure and flow conditions.

We claim:

1. An automatic gas blending system for the accurate mixing of a desired proportion of a first gas into a second gas under variable gas flow conditions, comprising:

(a) a flowline for said first gas;

(b) a flowline for said second gas;

(c) a common discharge manifold in flow communication with the discharge ends of said flow lines for the first gas and the second gas;

(d) means for removing mixed first gas and second gas from said common discharge manifold;

(e) pressure and temperature sensing means positioned in the flow line for said first gas and in the flow line for said second gas, said sensing means being adapted for the sending of input process variable signals proportioned to gas pressure and temperature in said flow lines;

(f) flow meters positioned in the flow line for said first gas and in the flow line for said second gas, said flow meters being adapted for the sending of input process variable signals proportional to the flow rate in said flow lines;

(g) a control valve for the control of the flow of said first gas in the first flow line;

(h) A process computer/controller adapted to receive said input signals from said pressure and temperature sensing means and said meters, and to send corresponding output signals to said control valve for the control of first gas flow under variable pressure, temperature and flow conditions, so as to maintain a desired blend of said first gas with the second gas;

(i) and including flow restriction orifices in said flowline for said first gas and in said flowline for the second gas, the orifice in the second line being positioned downstream of the flow meter positioned therein, the orifice in the first line being positioned downstream of the flow meter and of the control valve positioned therein, whereby said gas blending system constitutes a fully automated, reliable low cost means for accurately mixing the first gas with the second gas under varying pressure and flow conditions.

2. The automatic gas blending system of claim 1 and including check valves positioned in each flowline to prevent the backflow of gas therein, the check valve in the second line being positioned downstream of said flow meter positioned therein, the check valve in the first line being positioned downstream of the control valve positioned therein.

3. The automatic gas blending system of claim 2 in which the check valve in the second line is positioned downstream of the orifice therein, the check valve in the first line being positioned upstream of the orifice therein.

* * * * *